(12) United States Patent
Maita et al.

(10) Patent No.: US 10,783,199 B2
(45) Date of Patent: Sep. 22, 2020

(54) WEB SITE PRESENTATION METHOD, NON-TRANSITORY COMPUTER-READABLE RECORDING MEDIUM, AND WEB SITE PRESENTATION DEVICE

(71) Applicant: FUJITSU LIMITED, Kawasaki-shi, Kanagawa (JP)

(72) Inventors: Tsuyoshi Maita, Aomori (JP); Nobumi Noro, Aomori (JP); Yoichi Sato, Aomori (JP)

(73) Assignee: FUJITSU LIMITED, Kawasaki (JP)

( * ) Notice: Subject to any disclaimer, the term of this patent is extended or adjusted under 35 U.S.C. 154(b) by 175 days.

(21) Appl. No.: 15/590,642

(22) Filed: May 9, 2017

(65) Prior Publication Data

US 2017/0242927 A1 Aug. 24, 2017

Related U.S. Application Data

(63) Continuation of application No. PCT/JP2014/080273, filed on Nov. 14, 2014.

(51) Int. Cl.
 *G06F 16/9535* (2019.01)
 *G06F 16/28* (2019.01)
 (Continued)

(52) U.S. Cl.
 CPC .......... *G06F 16/9535* (2019.01); *G06F 16/00* (2019.01); *G06F 16/2468* (2019.01);
 (Continued)

(58) Field of Classification Search
 CPC ....... G06F 17/308687; G06F 17/30899; G06F 17/30935; G06F 16/9535; G06F 16/2468;
 (Continued)

(56) References Cited

U.S. PATENT DOCUMENTS

2002/0103625 A1 8/2002 Card et al.
2005/0021677 A1 1/2005 Musha et al.
(Continued)

FOREIGN PATENT DOCUMENTS

JP 2002-197028 7/2002
JP 2002-216009 8/2002
(Continued)

OTHER PUBLICATIONS

Extended European Search Report dated Jul. 7, 2017 in corresponding European Patent Application No. 14906085.7.
(Continued)

*Primary Examiner* — Chris Parry
*Assistant Examiner* — Steven C Nguyen
(74) *Attorney, Agent, or Firm* — Staas & Halsey, LLP

(57) ABSTRACT

A site presentation method includes detecting a characteristic about a feeling for each of a plurality of sites based on a word in a document in each of the plurality of sites, using a processor. The site presentation method includes specifying, based on an access history of a certain user to any of the plurality of sites, a characteristic of a user about a feeling corresponding to the certain user based on a detected characteristic of a site accessed by the certain user, using the processor. The site presentation method includes extracting, from the plurality of sites, a site in which a characteristic that is the same as or similar to the specified characteristic of the user is detected, and presenting the extracted site to the certain user, using the processor.

5 Claims, 13 Drawing Sheets

| SPOT NAME | EXPLANATION | KEYWORD | PREFERENCE TAG POINT |
|---|---|---|---|
| ○○ HALL | FROM A NICE CORRIDOR, YOU CAN SEE THE EVENING SUN IN THE FRONT... A FEELING OF SOLIDITY IS ITS CHARACTERISTIC. IT IS DESIGNATED AS COUNTRY'S XX... IT IS A PRECIOUS PLACE. | BEAUTIFUL | graceful(ELEGANT, POLITE, SOPHISTICATED): 1 POINT pleasing(PLEASANT, DESIRABLE): 1 POINT attractive(STYLISH, SMART, NICE): 1 POINT feeling(MOOD, THOUGHT, CONSIDERATION): 1 POINT shine(SPARKLE): 1 POINT information(KNOWLEDGE, EXPERIENCE, DATA): 1 POINT writing(PIECE OF WRITING, DOCUMENT, LITERARY WORK): 1 POINT |
| | | EMOTION | |
| | | SHINE | |
| | | MATERIAL | |
| TSUGARU △ | ...THAT CONNECTS THE MAIN ISLAND AND HOKKAIDO. | BEAUTIFUL | graceful(ELEGANT, POLITE, SOPHISTICATED): 1 POINT ... |
| | | SNOW SCENE | |
| ... | ... | ... | ... |

(51) Int. Cl.
  *G06F 16/957* (2019.01)
  *G06F 16/2458* (2019.01)
  *G06F 16/835* (2019.01)
  *G06F 16/00* (2019.01)
(52) U.S. Cl.
  CPC ........ *G06F 16/285* (2019.01); *G06F 16/8365* (2019.01); *G06F 16/957* (2019.01)
(58) Field of Classification Search
  CPC ........... G06F 16/16285; G06F 16/8365; G06F 16/957; G06F 16/00
  See application file for complete search history.

(56) References Cited

U.S. PATENT DOCUMENTS

| | | | |
|---|---|---|---|
| 2008/0250026 A1* | 10/2008 | Linden | G06Q 30/02 |
| 2009/0012946 A1* | 1/2009 | Tsunokawa | H04N 21/466 |
| 2009/0254653 A1 | 10/2009 | Kowa et al. | |
| 2011/0246561 A1* | 10/2011 | Eshima | G06F 16/9535 709/203 |
| 2012/0330976 A1* | 12/2012 | Tsuchida | G06F 40/157 707/749 |
| 2015/0106285 A1* | 4/2015 | Chu | G06Q 50/14 705/319 |
| 2015/0300831 A1* | 10/2015 | Sernicola | G01C 21/3476 701/408 |
| 2016/0063004 A1* | 3/2016 | Oskooi | G06F 16/9535 715/201 |

FOREIGN PATENT DOCUMENTS

| | | |
|---|---|---|
| JP | 2002-238856 | 8/2002 |
| JP | 2004-318736 | 11/2004 |
| JP | 2004-348241 | 12/2004 |
| JP | 2009-252011 | 10/2009 |
| JP | 2010-140433 | 6/2010 |
| JP | 2011-113281 | 6/2011 |
| JP | 2012-88800 | 5/2012 |
| JP | 2013-77262 | 4/2013 |
| JP | 2013-171500 | 9/2013 |
| WO | WO 2013/131432 A1 | 9/2013 |

OTHER PUBLICATIONS

Kutsumi H et al.; "Development of a User Adaptive Home Page Reccomendation Software, 'WebNavigator'", Systems & Computers in Japan, Wiley, Hoboken, NJ, US vol. 34, No. 3, Mar. 1, 2003, pp. 44-52, XP001159587.
Office Action dated Aug. 10, 2018 in corresponding European Patent Application No. 14 906 085.7, 8 pgs.
International Search Report dated Feb. 17, 2015 in corresponding International Application No. PCT/JP2014/080273.
Written Opinion of the International Searching Authority dated Feb. 17, 2015 in corresponding International Application No. PCT/JP2014/080273.

* cited by examiner

FIG.3

| SPOT NAME | EXPLANATION | KEYWORD | PREFERENCE TAG POINT |
|---|---|---|---|
| ◯◯ HALL | FROM A NICE CORRIDOR, YOU CAN SEE THE EVENING SUN IN THE FRONT… A FEELING OF SOLIDITY IS ITS CHARACTERISTIC. IT IS DESIGNATED AS COUNTRY'S XX… IT IS A PRECIOUS PLACE. | BEAUTIFUL | graceful(ELEGANT, POLITE, SOPHISTICATED): 1 POINT pleasing(PLEASANT, DESIRABLE): 1 POINT attractive(STYLISH, SMART, NICE): 1 POINT |
| | | EMOTION | feeling(MOOD, THOUGHT, CONSIDERATION): 1 POINT |
| | | SHINE | shine(SPARKLE): 1 POINT information(KNOWLEDGE, EXPERIENCE, DATA): 1 POINT |
| | | MATERIAL | writing(PIECE OF WRITING, DOCUMENT, LITERARY WORK): 1 POINT |
| TSUGARU △ | …THAT CONNECTS THE MAIN ISLAND AND HOKKAIDO. | BEAUTIFUL | graceful(ELEGANT, POLITE, SOPHISTICATED): 1 POINT |
| | | SNOW SCENE | … |
| … | … | … | … |

FIG.4

| USER | PREFERENCE TAG POINT |
|---|---|
| USER A | graceful(ELEGANT, POLITE, SOPHISTICATED): 1 POINT<br>pleasing(PLEASANT, DESIRABLE): 1 POINT<br>attractive(STYLISH, SMART, NICE): 1 POINT<br>feeling(MOOD, THOUGHT, CONSIDERATION): 1 POINT<br>shine(SPARKLE): 1 POINT<br>information(KNOWLEDGE, EXPERIENCE, DATA): 1 POINT<br>writing(PIECE OF WRITING, DOCUMENT, LITERARY WORK): 1 POINT |
| ... | ... |

FIG.5

| SPOT NAME | EXPLANATION |
|---|---|
| OO HALL | FROM A NICE CORRIDOR, YOU CAN SEE THE EVENING SUN IN THE FRONT... A FEELING OF SOLIDITY IS ITS CHARACTERISTIC. IT IS DESIGNATED AS COUNTRY'S XX... IT IS A PRECIOUS PLACE. |

FIG.6

| SPOT NAME | EXPLANATION | KEYWORD |
|---|---|---|
| ○○ HALL | FROM A NICE CORRIDOR, YOU CAN SEE THE EVENING SUN IN THE FRONT... A FEELING OF SOLIDITY IS ITS CHARACTERISTIC. IT IS DESIGNATED AS COUNTRY'S XX... IT IS A PRECIOUS PLACE. | BEAUTIFUL, EMOTION, BRICK, SHINE, BIG MANSION, SOLID, MATERIAL |

FIG.7

| SPOT NAME | EXPLANATION | KEYWORD | PREFERENCE TAG POINT |
|---|---|---|---|
| ○○ HALL | FROM A NICE CORRIDOR, YOU CAN SEE THE EVENING SUN IN THE FRONT... A FEELING OF SOLIDITY IS ITS CHARACTERISTIC. IT IS DESIGNATED AS COUNTRY'S XX... IT IS A PRECIOUS PLACE. | BEAUTIFUL | graceful(ELEGANT, POLITE, SOPHISTICATED) pleasing(PLEASANT, DESIRABLE) attractive(STYLISH, SMART, NICE) |
| | | EMOTION | feeling(MOOD, THOUGHT, CONSIDERATION) |
| | | SHINE | shine(SPARKLE) |
| | | MATERIAL | information(KNOWLEDGE, EXPERIENCE, DATA) writing(PIECE OF WRITING, DOCUMENT, LITERARY WORK) |

FIG.12

COLLECT URL: http://www.XXX.jp/Detail_display.html

| SPOT NAME | EXPLANATION |
|---|---|
| ○○ HALL | FROM A NICE CORRIDOR, YOU CAN SEE THE EVENING SUN IN THE FRONT... A FEELING OF SOLIDITY IS ITS CHARACTERISTIC. IT IS DESIGNATED AS COUNTRY'S XX... IT IS A PRECIOUS PLACE. |

URL: http://YYYi.or.jp/modules/contents/a01.html

| SPOT NAME | EXPLANATION |
|---|---|
| GUIDE MAP OF PREMISES | TWO YEARS BEFORE ○○ WAS BORN... FATHER △ BUILT THIS BIG MANSION. THIS BIG MANSION IS UNCOMMON IN THAT TIME... THEREAFTER, IT HAS BEEN OPENED TO THE PUBLIC AS A MUSEUM. |

| SPOT NAME | EXPLANATION | KEYWORD |
|---|---|---|
| ○○ HALL | <OMITTED> | CULTURE, MEIJI, WOOD CONSTRUCTION, MATERIAL, LETTER, TRANSLATION, CRADLE, PRECIOUS, WORK |

| SPOT NAME | EXPLANATION | KEYWORD | SUPERORDINATE WORD OF KEYWORD |
|---|---|---|---|
| ○○ HALL | <OMITTED> | CULTURE | perceptiveness(SENSE OF BEAUTY, INSIGHT, DISCERNMENT) |
| | | WORK | output(END PRODUCT) creation(CREATURE) production(PRODUCT) |
| | | CRADLE | beginning(BUDDING, ORIGIN, VERY START) |
| | | MATERIAL | information(KNOWLEDGE, EXPERIENCE, DATA) writing(PIECE OF WRITING, DOCUMENT, LITERARY WORK) |

FIG.13

| SPOT NAME | EXPLANA-TION | KEYWORD | PREFERENCE TAG POINT |
|---|---|---|---|
| OO HALL | <OMITTED> | CULTURE | perceptiveness(SENSE OF BEAUTY, INSIGHT, DISCERNMENT): 1 POINT |
| | | WORK | output(END PRODUCT): 1 POINT<br>creation(CREATURE): 1 POINT<br>production(PRODUCT): 1 POINT |
| | | CRADLE | beginning(BUDDING, ORIGIN, VERY START): 1 POINT<br>information(KNOWLEDGE, EXPERIENCE, DATA): 1 POINT |
| | | MATERIAL | writing(PIECE OF WRITING, DOCUMENT, LITERARY WORK): 1 POINT |

| USER | PREFERENCE TAG POINT |
|---|---|
| USER A | perceptiveness(SENSE OF BEAUTY, INSIGHT, DISCERNMENT): 1 POINT<br>output(END PRODUCT): 1 POINT<br>creation(CREATURE): 1 POINT<br>production(PRODUCT): 1 POINT<br>beginning(BUDDING, ORIGIN, VERY START): 1 POINT<br>information(KNOWLEDGE, EXPERIENCE, DATA): 1 POINT<br>writing(PIECE OF WRITING, DOCUMENT, LITERARY WORK): 1 POINT |

WEB SITE PRESENTATION METHOD, NON-TRANSITORY COMPUTER-READABLE RECORDING MEDIUM, AND WEB SITE PRESENTATION DEVICE

CROSS-REFERENCE TO RELATED APPLICATION

This application is a continuation application of International Application PCT/JP2014/080273, filed on Nov. 14, 2014, and designating the U.S., the entire contents of which are incorporated herein by reference.

FIELD

The present invention relates to a site presentation method, a site presentation program, and a site presentation device.

BACKGROUND

In the related art, to search for information such as a tourist spot where a user has traveled and a tourist spot preferred by the user, the user views various Web sites introducing the tourist spot by using the Internet and the like. A provider of the Web site counts page views of Web pages in the Web site to grasp a viewing status, which improves the Web pages.

In recent years, a tourism cloud and the like have started to be used, the tourism cloud providing a Web site by collecting information about a certain tourist spot and the like and reediting the information to be new content by permission of an enterprise and the like providing a Web site.

Patent Literature 1: Japanese Laid-open Patent Publication No. 2012-88800
Patent Literature 2: Japanese Laid-open Patent Publication No. 2011-113281
Patent Literature 3: Japanese Laid-open Patent Publication No. 2002-238856
Patent Literature 4: Japanese Laid-open Patent Publication No. 2004-348241
Patent Literature 5: Japanese Laid-open Patent Publication No. 2004-318736
Patent Literature 6: Japanese Laid-open Patent Publication No. 2002-197028
Patent Literature 7: Japanese Laid-open Patent Publication No. 2002-216009

However, even when the technique described above is used, the user needs to change a search condition and the like until a tourist spot that the user actually desires to view is retrieved, which makes an operation complicated and troublesome. Although the tourism cloud can provide a Web page in accordance with comprehensive information such as the number of page views, it is difficult to appropriately select and provide Web pages preferred by different users.

SUMMARY

According to an aspect of an embodiment, a site presentation method includes: detecting a characteristic about a feeling for each of a plurality of sites based on a word in a document in each of the plurality of sites, using a processor; specifying, based on an access history of a certain user to any of the plurality of sites, a characteristic of a user about a feeling corresponding to the certain user based on a detected characteristic of a site accessed by the certain user, using the processor; and extracting, from the plurality of sites, a site in which a characteristic that is the same as or similar to the specified characteristic of the user is detected, and presenting the extracted site to the certain user, using the processor.

The object and advantages of the invention will be realised and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of information stored in a spot DB according to the first embodiment.
FIG. 4 is a diagram illustrating an example of information stored in a user DB according to the first embodiment.
FIG. 5 is a diagram illustrating an example of spot information to be collected.
FIG. 6 is a diagram illustrating an example of keyword extraction.
FIG. 7 is a diagram illustrating an example of superordinate word acquisition.
FIG. 12 is a diagram for explaining a procedure of giving a preference tag point according to the second embodiment.
FIG. 13 is a diagram for explaining a result of giving a preference tag point according to the second embodiment.

DESCRIPTION OF EMBODIMENTS

The following describes embodiments of a site presentation method, a site presentation program, and a site presentation device according to the present invention in detail based on the drawings. The present invention is not limited to the embodiments. The embodiments can be appropriately combined with each other without contradiction.

[a] First Embodiment

Figure 1:
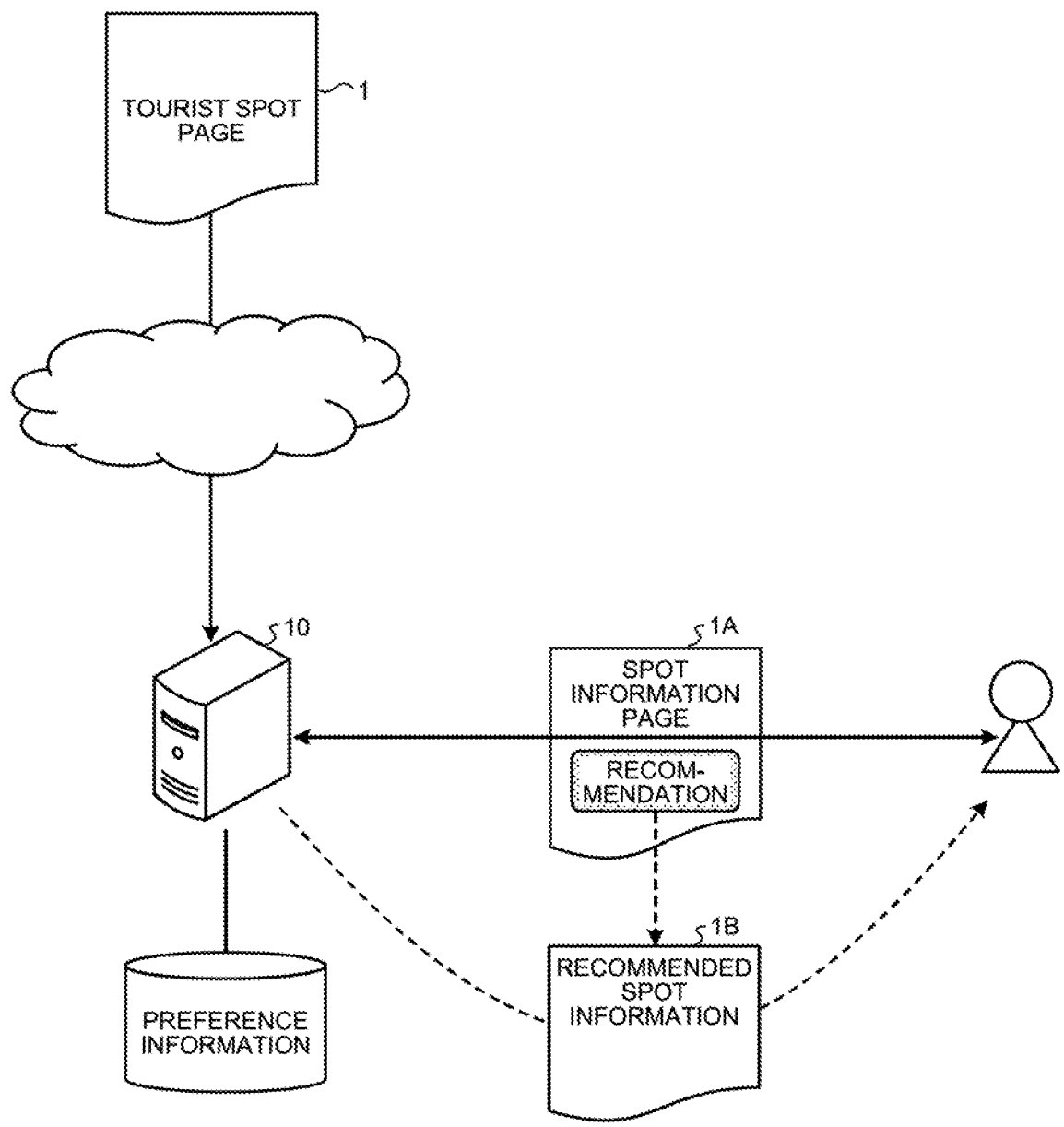
FIG. 1 is a diagram illustrating an example of the entire configuration of a system according to a first embodiment.

[Overall Configuration]
FIG. 1 is a diagram illustrating an example of the entire configuration of a system according to a first embodiment. As illustrated in FIG. 1, the system includes a site presentation device 10 connected to another device via a network such as the Internet. For example, the site presentation device 10 is an example of a tourism cloud that collects information about a tourist spot from other Web sites to provide the information to a user. The present embodiment describes a Web site of a tourist spot by way of example. Examples of the tourist spot include remains, a festival, and a World Heritage site.

The site presentation device 10 is connected to various external servers via a network. For example, the site preservation device 10 is connected to a word management server that manages a word and determines whether an inquired keyword is present as a word, a superordinate word management server that extracts, from a keyword, a superordinate hierarchy obtained by causing the keyword to be a superordinate concept and a superordinate word.

The site presentation device 10 detects a characteristic of a feeling for each of a plurality of sites based on a word in a document of each of the sites. The site presentation device 10 specifies a characteristic of a user related to a feeling corresponding to a certain user based on an access history to any of the sites of the certain user. Thereafter, the site presentation device 10 extracts, from a plurality of sites, a site in which a characteristic that is the same as or similar to the specified characteristic of the user is detected, and presents the site to the certain user.

The first embodiment describes an example of extracting a characteristic related to a feeling of the user for each Web site including a plurality of Web pages, and proposing recommended information suited for preference of the user. For example, the following exemplifies Web sites including a Web page of OO hall, a Web page of x park, a Web page of Δ harbor, and the like.

The site presentation device 10 acquires, from a Web site 1 including a Web page introducing a tourist spot, information about the tourist spot described in the Web page. The site presentation device 10 extracts keywords for specifying the tourist spot in accordance with the acquired information about the tourist spot. The site presentation device 10 transmits the extracted keywords to an external word management server, and acquires a keyword present as a word from the extracted keywords.

Subsequently, the site presentation device 10 transmits the keyword present as a word to an external superordinate word management server, and acquires a superordinate word of each keyword. The site presentation device 10 gives, as a preference tag, the acquired superordinate word of the keyword to a target tourist spot, and gives a point previously associated with the superordinate word thereto.

In such a state, when receiving a search request for a tourist spot AAA from a user terminal, the site presentation device 10 transmits, as a response, a Web page in which information about the tourist spot AAA collected from other Web sites is displayed.

At this point, the site presentation device 10 acquires, from the user terminal, user information such as an Internet protocol (IP) address and the user terminal. The site presentation device 10 gives, to the acquired user information, the preference tag and the point associated with the tourist spot viewed by the user. That is, the site presentation device 10 gives, to the user information, "preference tag (beautiful), point (1 point)" and the like given to the tourist spot AAA.

In this way, every time Web pages of various tourist spots are viewed by the user terminal, the site presentation device 10 gives, to the user terminal, the preference tag and the point of the viewed tourist spot. The site presentation device 10 specifies a trend of preference of each user terminal.

Thereafter, when receiving the search request from the user terminal of the user the trend of preference of whom is specified, the site presentation device 10 transmits a Web page 1A as a search result to the user terminal as a response, and causes recommended information corresponding to the trend of preference of the user to be displayed in the Web page 1A. When receiving selection of the recommended information from the user terminal, the site presentation device 10 transmits a Web page 1B in which the recommended information is displayed to the user terminal as a response.

In this way, the site presentation device 10 extracts corresponding preference for each piece of tourist spot information, extracts user's preference from the access history to the tourist spot information, and presents the tourist spot information corresponding to the user's preference. As a result, the site presentation device 10 can provide a site desired by the user.

[Functional Configuration]

Figure 2:
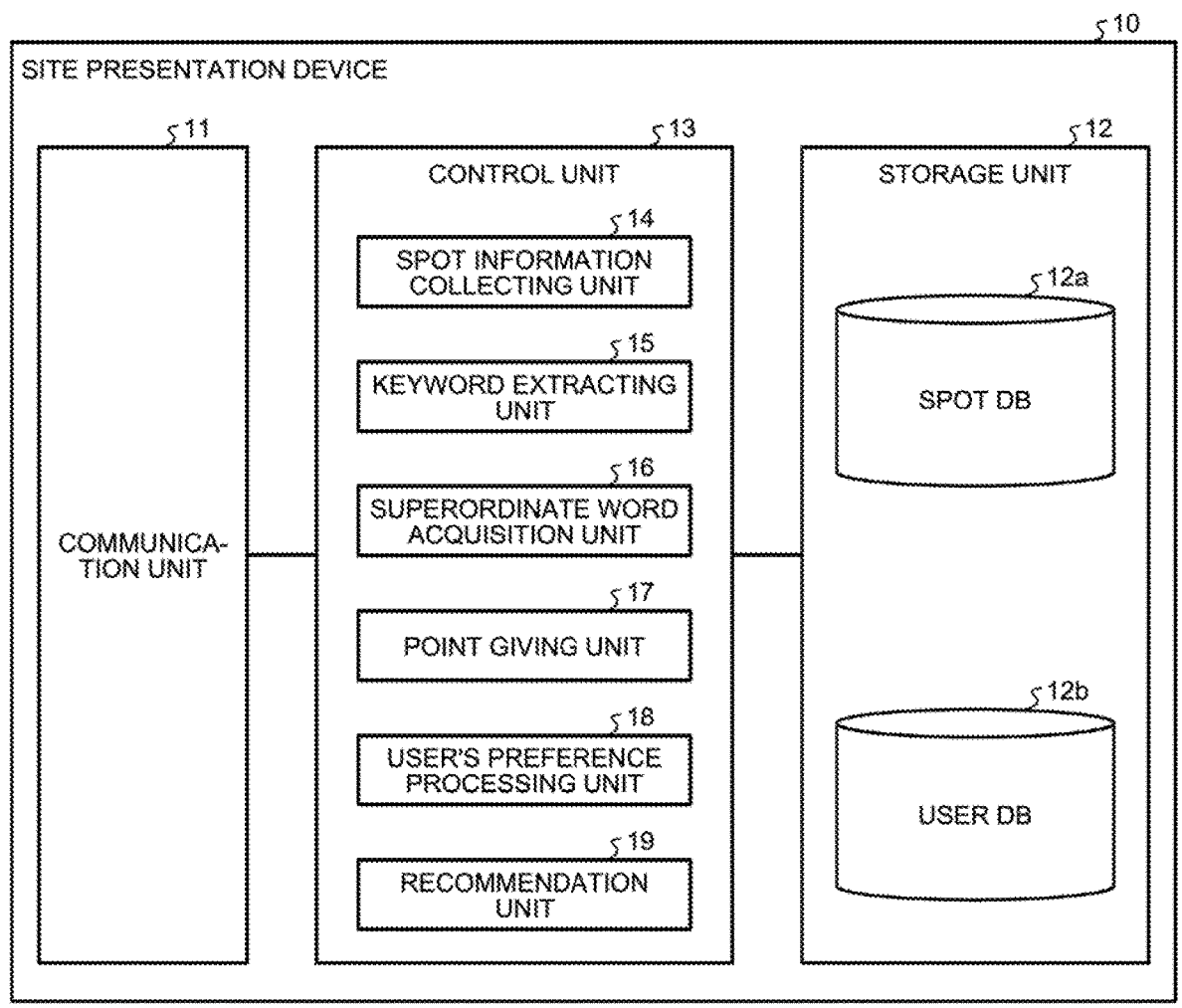
FIG. 2 is a functional block diagram illustrating a functional configuration of a site presentation device according to the first embodiment.

FIG. 2 is a functional block diagram illustrating a functional configuration of the site presentation device according to the first embodiment. As illustrated in FIG. 2, the site presentation device 10 includes a communication unit 11, a storage unit 12, and a control unit 13.

The communication unit 11 is a processing unit that controls communication of another device. Examples of the communication unit 11 include a network interface card. For example, the communication unit 11 transmits and receives data to/from a server providing another Web site, and communicates with the user terminal using a Web browser.

The storage unit 12 is a storage device that stores a computer program executed by the control unit 13, a spot DB 12a, and a user DB 12b. Examples of the storage unit 12 include a memory and a hard disk.

The spot DB 12a is a database that stores a preference tag point given to each tourist spot. In the first embodiment, the spot DB 12a is prepared for each Web site. FIG. 3 is a diagram illustrating an example of information stored in the spot DB according to the first embodiment. As illustrated in FIG. 3, the spot DB 12a associates "spot name, explanation, keyword, preference tag point" with each other to be stored.

The "spot name" to be stored herein is information for specifying the tourist spot. The "explanation" is content about the tourist spot described in the Web page. The "keyword" is a word extracted from the explanation, which is assumed to be information for specifying the tourist spot. The "preference tag point" is a preference tag and a point given to the tourist spot specified with the spot name. A method of giving the point will be described later.

In a case of FIG. 3, there is the explanation of "From a nice corridor, you can see the evening sun in the front . . . " in the Web page for the "OO hall", and "beautiful, emotion, shine, material" are extracted as keywords. To the "OO hall", "graceful (elegant, polite, sophisticated): 1 point, pleasing (pleasant, desirable): 1 point, attractive (stylish, smart, nice): 1 point" are given as preference tag points.

To the "OO hall", "feeling (mood, thought, consideration): 1 point, shine (sparkle): 1 point, information (knowledge, experience, data): 1 point, writing (piece of writing, document, literary work): 1 point" are given as the preference tag points.

The words such as graceful (elegant, polite, sophisticated) and pleasing (pleasant, desirable) are superordinate words of the keywords, and are preference tags assumed to be used for estimating the tourist spot or searching for the tourist spot. The point such as 1 point is a point assigned to the preference tag. Association between the preference tag and the point is designated by an administrator and the like in advance, and stored in the storage unit 12 and the like.

The user DB 12b is a database that stores the preference tag point given to the user. FIG. 4 is a diagram illustrating an example of information stored in the user DB according to the first embodiment. As illustrated in FIG. 4, the user DB 12b associates "user, preference tag point" with each other to be stored.

The "user" to be stored herein is information for specifying the user such as a user name, an ID, and an IP address, which can be acquired through Web access and the like. The "preference tag point" is the preference tag and the point given to the user.

FIG. 4 exemplifies a case in which "graceful (elegant, polite, sophisticated): 1 point, pleasing (pleasant, desirable): 1 point, attractive (stylish, smart, nice); 1 point" are given to a user A. FIG. 4 also exemplifies a case in which "feeling (mood, thought, consideration): 1 point, shine (sparkle): 1 point, information (knowledge, experience, data): 1 point, writing (piece of writing, document, literary work): 1 point" are given to the user A.

That is, comparing FIG. 3 to FIG. 4, the same preference tag point as the preference tag point given to OO hall is given to the user A, so that it can be found that the user A has viewed the Web page of OO hall.

The control unit 13 is a processing unit that rules the entire processing of the site presentation device 10. Examples of the control unit 13 include a processor. The control unit 13 includes a spot information collecting unit 14, a keyword extracting unit 15, a superordinate word acquisition unit 16, a point giving unit 17, a user's preference processing unit 18, and a recommendation unit 19. The spot information collecting unit 14, the keyword extracting unit 15, the superordinate word acquisition unit 16, the point giving unit 17, the user's preference processing unit 18, and the recommendation unit 19 are examples of a process executed by part of an electronic circuit and a processor. The spot information collecting unit 14, the keyword extracting unit 15, the superordinate word acquisition unit 16, and the point giving unit 17 are examples of a detection unit, the user's preference processing unit 18 is an example of a specification unit, and the recommendation unit 19 is an example of a presentation unit.

The spot information collecting unit 14 is a processing unit that collects information about various tourist spots from an external Web server. Specifically, the spot information collecting unit 14 accesses the Web site providing the Web page of the tourist spot designated by the administrator and the like, acquires explanations of the tourist spot, and associates the explanations with each other to be stored in the spot DB 12a.

FIG. 5 is a diagram illustrating an example of the spot information to be collected. As illustrated in FIG. 5, the spot information collecting unit 14 accesses the Web page introducing OO hall, and acquires the explanation of "From a nice corridor, you can see the evening sun in the front . . . it is a precious place". The spot information collecting unit 14 associates the spot name of "OO hall" with the explanation of "From a nice corridor, you can see the evening sun in the front . . . it is a precious place" to be stored in the spot DB 12a. The spot information collecting unit 14 outputs the collected information to the keyword extracting unit 15.

The keyword extracting unit 15 is a processing unit that extracts, from the collected information about the tourist spot, keyword that specifies the tourist spot and a keyword that is assumed to suggest the tourist spot. Specifically, the keyword extracting unit 15 extracts a keyword obtained by decomposing the explanation of the tourist spot collected by the spot information collecting unit 14 into words. Details about word decomposition will not be described herein because various known techniques can be used.

FIG. 6 is a diagram illustrating an example of keyword extraction. As illustrated in FIG. 6, the keyword extracting unit 15 extracts "beautiful, emotion, brick, shine, big mansion, solid, material" from the explanation of "the spot name (OO hall) and the explanation (From a nice corridor, you can see the evening sun in the front . . . it is a precious place)" collected by the spot information collecting unit 14.

Subsequently, the keyword extracting unit 15 transmits the extracted keywords of "beautiful, emotion, brick, shine, big mansion, solid, material" to the word management server, and inquires whether each keyword is present as a word. For example, the word management server determines whether "An Entity of Type" of each inquired keyword is "Thing". The keyword extracting unit 15 outputs, to the superordinate word acquisition unit 16, a tourist spot name and a keyword "An Entity of Type" of which is determined to be "Thing" by the word management server.

The superordinate word acquisition unit 16 is a processing unit that acquires a superordinate word of the keyword extracted by the keyword extracting unit 15. Specifically, the superordinate word acquisition unit 16 transmits, to the superordinate word management server, each keyword input from the keyword extracting unit 15, and acquires the superordinate word of each keyword. For example, the superordinate word, acquisition, unit 16 acquires presence of a keyword, a superordinate word, a part of speech, and the like.

FIG. 7 is a diagram illustrating an example of superordinate word acquisition. As illustrated in FIG. 7, the superordinate word acquisition unit 16 acquires "beautiful, emotion, shine, material" as keywords of the "OO hall". The superordinate word acquisition unit 16 then transmits the keyword "beautiful" to the superordinate word management server, and acquires "graceful (elegant, polite, sophisticated), pleasing (pleasant, desirable), attractive (stylish, smart, nice)" as superordinate words.

The superordinate word acquisition unit 16 transmits the keyword "emotion" to the superordinate word management server, and acquires "feeling (mood, thought, consideration)" as the superordinate word. The superordinate word acquisition unit 16 transmits the keyword "shine" to the superordinate word management server, and acquires "shine (sparkle)" as the superordinate word. The superordinate word acquisition unit 16 transmits the keyword "material" to the superordinate word management server, and acquires "information (knowledge, experience, data), writing (piece of writing, document, literary work)" as the superordinate words. Thereafter, the superordinate word acquisition unit 16 outputs the information illustrated in FIG. 7 to the point giving unit 17.

The point giving unit 17 is a processing unit that gives the preference tag point to the tourist spot. Specifically, the point giving unit 17 gives the preference tag point to each tourist spot acquired from the Web site to be stored in the spot DB 12a in accordance with the information input from the superordinate word acquisition unit 16 and a table of correspondence between a keyword and a point previously stored in the storage unit 12 and the like.

For example, the point giving unit 17 refers to the table of correspondence and the like to specify that the superordinate word "graceful (elegant, polite, sophisticated)" is 1 point, and the superordinate word "pleasing (pleasant, desirable)" is 1 point, and the like. The point giving unit 17 gives a point to each superordinate word illustrated in FIG. 7 to generate the information illustrated in FIG. 3. As a result, a keyword, a superordinate word, and a point are given to each tourist spot.

The user's preference processing unit 18 is a processing unit that gives a corresponding preference tag point to the user who has viewed the Web page. Specifically, the user's preference processing unit 18 extracts, via a Web browser and the like, a user name, an ID, an IP address, and the like from a user terminal that has accessed the Web site.

The user's preference processing unit 18 acquires, from the spot DB 12a, the preference tag point associated with the Web page displayed on the user terminal, that is, the tourist spot viewed by the user. Thereafter, the user's preference processing unit 18 associates the extracted user information with the acquired preference tag point to be stored in the user DB 12b. That is, the user's preference processing unit 18 adds, to the preference tag point of the user, the preference tag point associated with the tourist spot viewed by the user.

For example, with reference to FIG. 3, when the user A has viewed a Web page of OO hall, the user's preference processing unit 18 gives "graceful (elegant, polite, sophisticated): 1 point, pleasing (pleasant, desirable): 2 point, attractive (stylish, smart, nice): 1 point" to the user A. The user's preference processing unit 18 further gives "feeling (mood, thought, consideration): 1 point, shine (sparkle): 1 point, information (knowledge, experience, data): 1 point, writing (piece of writing, document, literary work): 1 point" to the user A.

Thereafter, every time the user views the tourist spot using the user terminal, the user's preference processing unit 18 gives a corresponding preference tag point to the user. When the same superordinate words are present in giving the preference tag point, the user's preference processing unit 18 adds up points. That is, when "graceful (elegant, polite, sophisticated): 1 point" is further given in a state in which "graceful (elegant, polite, sophisticated): 1 point" is already given, the user's preference processing unit 18 gives "graceful (elegant, polite, sophisticated): 2 point".

The recommendation unit 19 is a processing unit that recommends, to the user, the tourist spot suited for preference of the user. Specifically, the recommendation unit 19 extracts user information of the user terminal that views the Web page of the tourist spot. The recommendation unit 19 specifies the preference tag point of the extracted user information from the user DB 12b, and estimates preference of the user using the specified result. That is, the recommendation unit 19 estimates preference of the user based on a viewing status of the Web page by the user. The recommendation unit 19 then causes the Web page of the tourist spot suited for the estimated preference of the user to be displayed in the Web page viewed by the user terminal as recommended information.

At this point, the recommendation unit 19 can preferentially select the tourist spot that is not viewed by the user yet based on the access history of the user. The recommendation unit 19 can preferentially select the tourist spot having the largest preference tag point among preference tag points associated with the user.

For example, the recommendation unit 19 specifies that the point of graceful (elegant, polite, sophisticated) is large, and the point of writing (piece of writing, document, literary work) is small for the user A. In this case, the recommendation unit 19 estimates that the user A is interested in a Web page associated with graceful (elegant, polite, sophisticated), and is not interested in a Web page associated with writing (piece of writing, document, literary work), for example. The recommendation unit 19 recommends a tourist spot associated with graceful (elegant, polite, sophisticated) to the user A.

The recommendation unit 19 specifies, for the user A, that an increasing rate of the point of writing (piece of writing, document, literary work) from 10 o'clock to 12 o'clock is equal to or larger than a threshold, for example. In this case, the recommendation unit 19 estimates that the user A frequently searches for a Web page associated with writing (piece of writing, document, literary work) from 10 o'clock to 12 o'clock. The recommendation unit 19 then recommends the tourist spot associated with writing (piece of writing, document, literary work) to the user A during a period from 10 o'clock to 12 o'clock.

Figure 8:
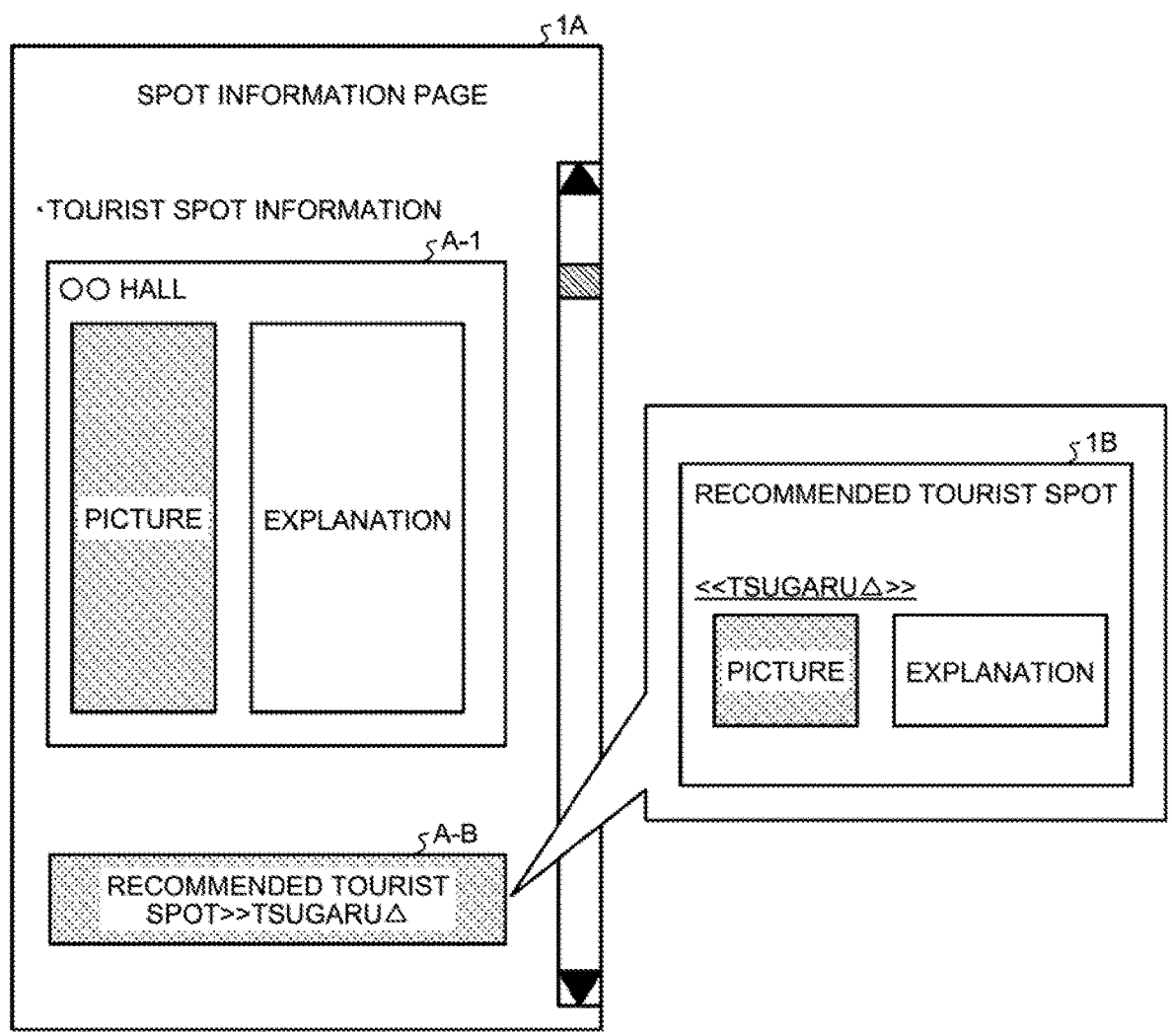
FIG. 8 is a diagram illustrating an example of a Web page including recommended information.

FIG. 8 is a diagram illustrating an example of the Web page including the recommended information. A Web page 1A illustrated in FIG. 8 is a Web page as a response when the user's preference processing unit 18 receives a search request for the tourist spot from the user terminal. As illustrated in FIG. 8, the user's preference processing unit 18 transmits, as a response to the user terminal, a Web page in which A-1 as information about a retrieved tourist spot "OO hall" is displayed.

The recommendation unit 19 estimates preference of the user who views A-1 as information about the tourist spot "OO hall", and specifies the tourist spot associated with the estimated preference to be "Tsugaru Δ". The recommendation unit 19 then causes "Tsugaru Δ" to be displayed as a recommended tourist spot for the user A in a predetermined space A-B in the Web page 1A viewed by the user. Thereafter, when receiving selection of "Tsugaru Δ" in the Web page 1A, the recommendation unit 19 causes a Web page 1B of the recommended tourist spot including content of the tourist spot "Tsugaru Δ" to be displayed on the user terminal.

[Processing Procedure]

Next, the following describes each processing procedure executed by the site presentation device 10. Herein, the following describes collection processing of collecting information about the tourist spot and proposal processing of proposing the tourist spot suited for preference of the user.

Collection Processing

Figure 9:
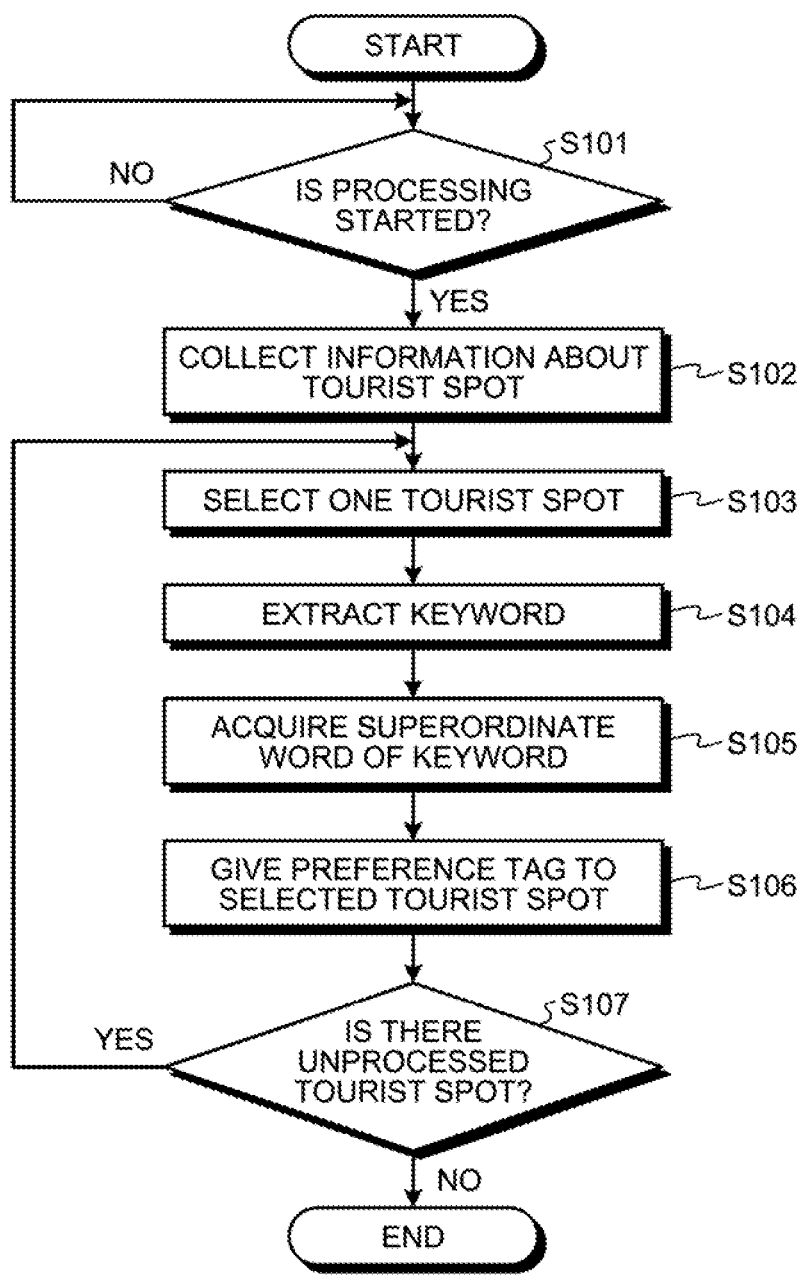
FIG. 9 is a flowchart illustrating a procedure of collection processing according to the first embodiment.

FIG. 9 is a flowchart illustrating a procedure of collection processing according to the first embodiment. As illustrated in FIG. 9, if processing is instructed to be started. (Yes at S101), the spot information collecting unit 14 accesses a designated Web site to collect information about a corresponding tourist spot (S102).

Subsequently, the keyword extracting unit 15 receives selection of the tourist spot (S103), and extracts a keyword from the explanation of the selected tourist spot (S104). The superordinate word acquisition unit 16 inquires of the superordinate word management server as to the keyword that is specified to be present as a word by the keyword extracting unit 15, and acquires a superordinate word (S105).

Thereafter, the point giving unit 17 gives the superordinate word acquired at S105 as a preference tag to the tourist spot as a processing target to be selected, and gives a point corresponding to the superordinate word thereto (S106).

If there is an unprocessed tourist spot (Yes at S107), the process at S103 and subsequent processes are repeated. It there is no unprocessed tourist spot (No at S107), the process is ended.

Proposal Processing

Figure 10:
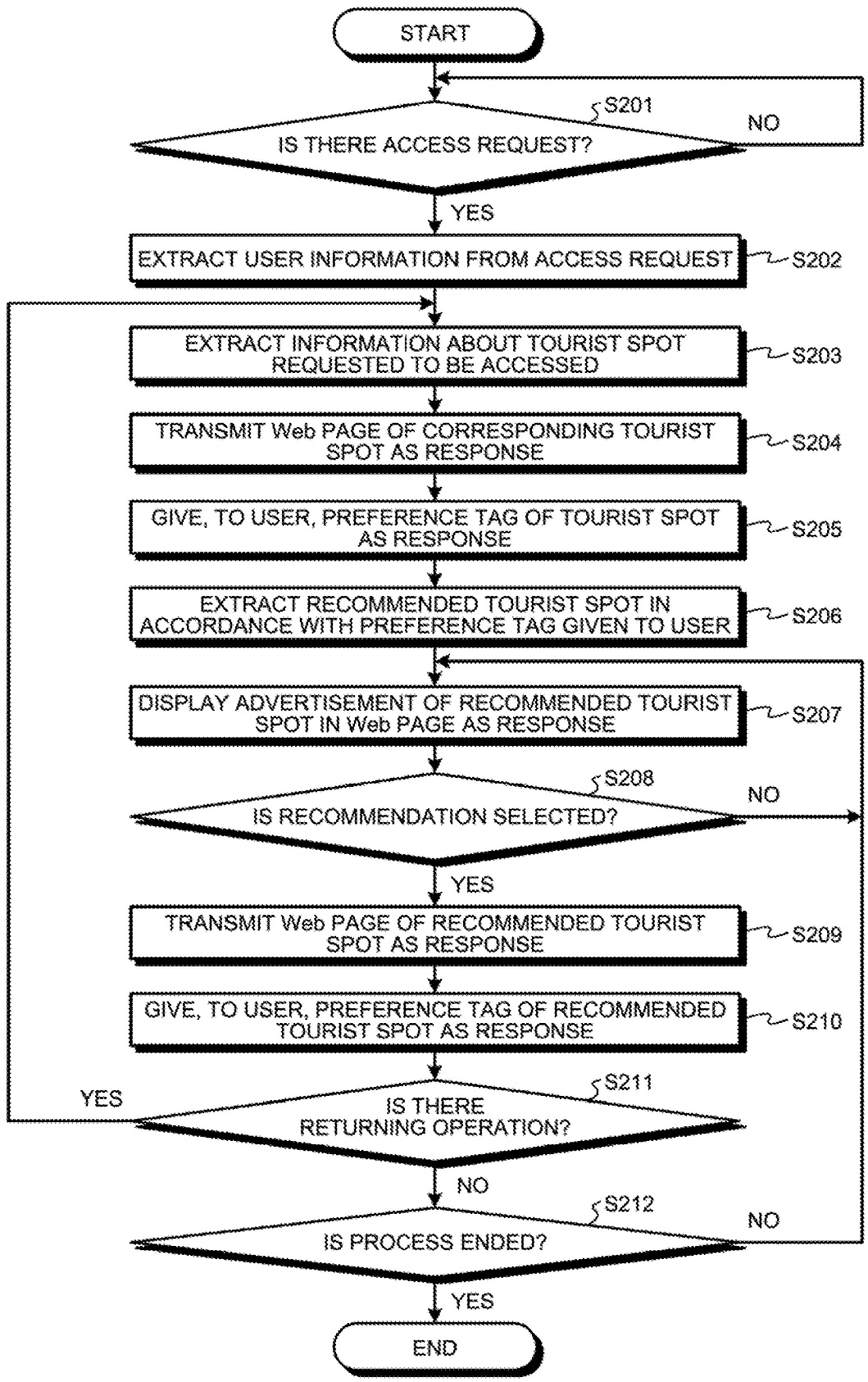
FIG. 10 is a flowchart illustrating a procedure of proposal processing according to the first embodiment.

FIG. 10 is a flowchart illustrating a procedure or proposal processing according to the first embodiment. As illustrated in FIG. 10, when receiving an access request from the user terminal (Yes at S201), the user's preference processing unit 18 extracts user information from the access request (S202).

Subsequently, the user's preference processing unit 18 extracts, from the spot DB 12a, the information about the tourist spot requested to be accessed (S203), and transmits, as a response to the user terminal, a Web page in which the information about the corresponding tourist spot is described (S204).

The user's preference processing unit 18 then acquires, from the spot DB 12a, a preference tag point of the tourist spot as a response, and gives the preference tag point to the user who uses the user terminal that has accessed the Web page (S205).

Subsequently, the recommendation unit 19 acquires the preference tag point given to the user from the user DB 12b to estimate preference of the user, and refers to the spot DB 12a to extract a recommended tourist spot corresponding to the estimated preference of the user (S206). At this point, the recommendation unit 19 can select and extract a tourist spot that is not viewed by the user yet based on the access history of the user.

The recommendation unit 19 causes an advertisement of the extracted tourist spot to be displayed in the Web page as a response (S207). If the advertisement is selected by the user terminal (Yes at S208), the recommendation unit 19 transmits, as a response to the user terminal, the Web page in which the information about the recommended tourist spot is described (S209). The process at S207 is executed until the advertisement is selected by the user terminal (No at S208).

The user's preference processing unit 18 specifies, from the spot DB 12a, the preference tag point given to the recommended tourist spot transmitted to the user terminal as a response, and gives the preference tag point to the user (S210).

Thereafter, if an operation of returning to an original Web page is received (Yes at S211), the process at S203 and subsequent processes are executed. If the operation of returning to the original Web page is not received (No at S211), the process at S207 and subsequent processes are repeated until an end operation is received (No at S212). If the end operation is received (Yes at S212), the process is ended.

As described above, the site presentation device 10 can specify a preference trend of each user and present recommended information matching with the preference trend, so that a site matching with desire of the user can be provided. The site presentation device 10 can present the tourist spot that is not viewed by the user yet, so that the site presentation device 10 can present an interesting tourist spot for the user that is not recognized by the user, which improves convenience for the user. Due to improvement in convenience for the user, the site presentation device 10 is actively used, and estimation accuracy of preference is improved.

[b] Second Embodiment

In the example described in the first embodiment, the preference tag point of the tourist spot is given for each Web site. However, the embodiment is not limited thereto. For example, the administrator may extract pieces of information about the same tourist spot from a plurality of different Web sites, and give the preference tag point to the tourist spot.

A second embodiment describes an example of extracting pieces of information about the same tourist spot from a plurality of Web sites, and giving the preference tag point to the tourist spot.

Figure 11:
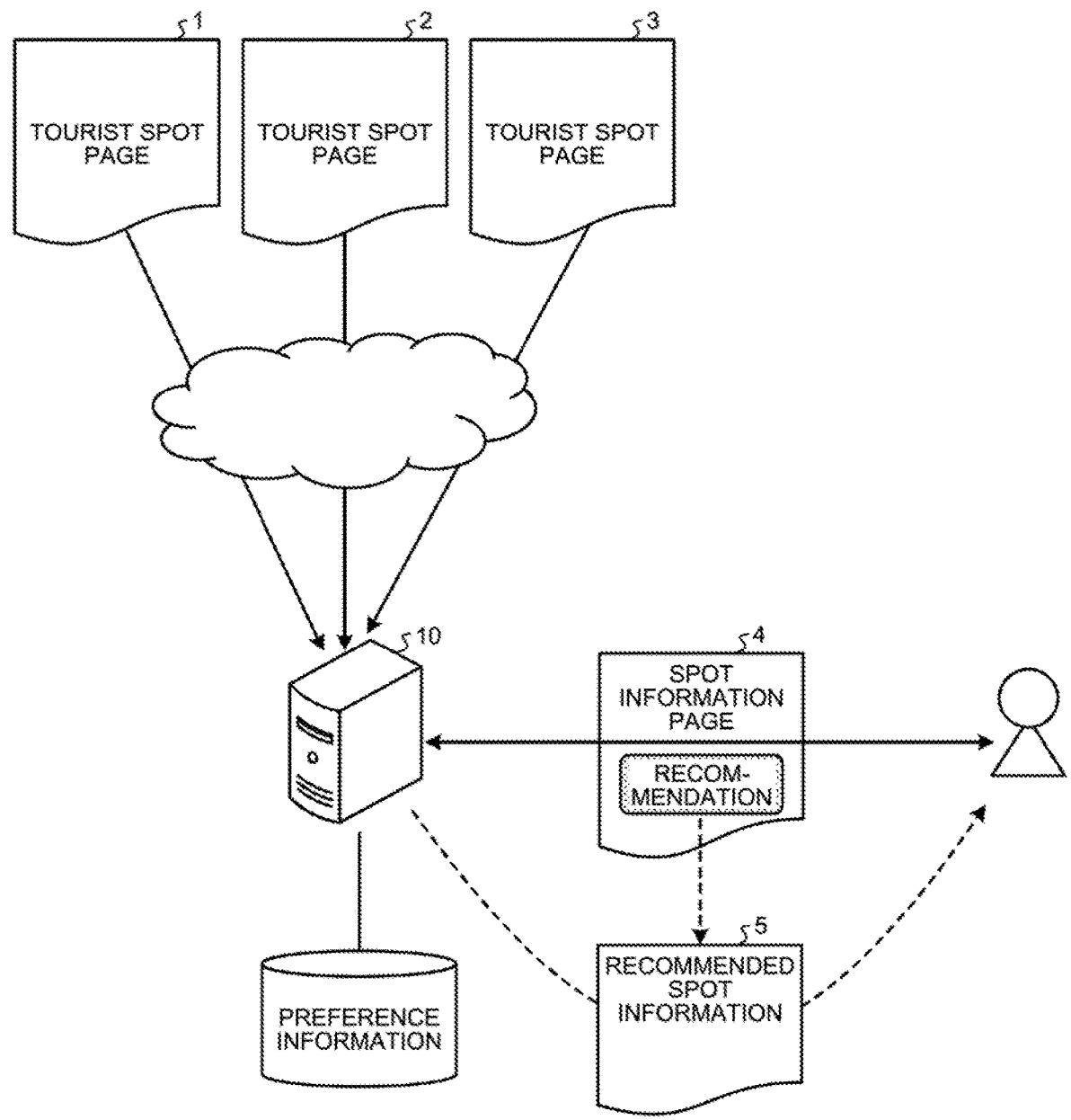
FIG. 11 is a diagram illustrating an example of the entire configuration of a system according to a second embodiment.

FIG. 11 is a diagram illustrating an example of the entire configuration of a system according to the second embodiment. As illustrated in FIG. 11, the site presentation device 10 is connected to a plurality of Web sites providing information about the tourist spot via a network such as the Internet.

In such a state, the site presentation device 10 acquires the information about the tourist spot from Web pages of each of Web sites 1, 2, and 3 explaining the same tourist spot. The site presentation device 10 extracts a keyword from acquired content (explanation) of each tourist spot, and acquires a superordinate word. Thereafter, the site presentation device 10 gives, as the preference tag point to one tourist soot, the superordinate word and the point of the keyword acquired from explanations of a plurality of Web sites.

Thereafter, similarly to the first embodiment, the site presentation device 10 estimates preference of the user based on the access history of the user, and proposes a tourist spot corresponding to the estimated preference as recommended information to a spot information page 4 viewed by the user. When receiving selection of the recommended information in the spot information page 4, the site presentation device 10 transmits, to the user terminal, a Web page 5 in which recommended, tourist spot information is described.

The following provides specific description with reference to FIGS. 12 and 13. FIG. 12 is a diagram for explaining a procedure of giving the preference tag point according to the second embodiment. FIG. 13 is a diagram for explaining a result of giving the preference tag point according to the second embodiment. Herein, the tourist spot "OO hall" is exemplified. In FIGS. 12 and 13, a portion where description is omitted is represented as <omitted>.

As illustrated in FIG. 12, the spot information collecting unit 14 accesses a Web page "http://www.XXX.jp/Detail_display.html" publishing information about the tourist spot "OO hall", and acquires the explanation "From a nice corridor . . . it is a precious place" of OO hall. Similarly, the spot information collecting unit 14 accesses a Web page "http://YYYi.or.jp/modules/contents/a01.html" publishing information about the tourist spot "guide map of premises" indicating the same information as OO hall, and acquires explanation "Two years before OO was born . . . opened to the public" of the guide map of premises.

The keyword extracting unit 15 registers both of "From a nice corridor . . . it is a precious place" and "Two years before OO was born . . . opened to the public" as explanations of the tourist spot "OO hall". Subsequently, the keyword extracting unit 15 executes word analysis on each of "From a nice corridor . . . it is a precious place" and "Two years before OO was born . . . opened to the public", and extracts "culture, Meiji, wood construction, material, letter, translation, cradle, precious, work" as keywords. That is, the keyword extracting unit 15 extracts the keyword suggesting the tourist spot "OO hall" from the explanation of each Web site.

The superordinate word acquisition unit it acquires the superordinate words of "culture, work, cradle, material" that are registered as words among the keywords extracted by the keyword extracting unit 15. Specifically, the superordinate word acquisition unit 16 acquires "perceptiveness (sense of beauty, insight, discernment)" as the superordinate word of the culture, and acquires "output (end product), creation (creature), production (product)" as superordinate words of the work. The superordinate word acquisition unit 16 acquires "beginning (budding, origin, very start)" as the superordinate words of the cradle, and acquires "information (knowledge, experience, data), writing (piece of writing, document, literary work)" as the superordinate words of the material.

Thereafter, the point, giving unit 17 gives, to the tourist spot "OO hall", the preference tag point that is acquired based on each of the explanation "From a nice corridor . . . it is a precious place" and the explanation "Two years before OO was born . . . opened to the public".

Specifically, as illustrated in FIG. 13, the point giving unit 17 gives "perceptiveness (sense of beauty, insight, discernment): 1 point, output (end product): 1 point, creation (creature): 1 point, production (product): 1 point" to the tourist spot "OO hall". The point giving unit 17 also gives, to the tourist, spot "OO hall", "beginning (budding, origin, very start): 1 point, information (knowledge, experience, data): 1 point, writing (piece of writing, document, literary work): 1 point".

Thereafter, when the user views the Web page related to OO hall such as the tourist spot "OO hall" and the tourist spot "guide map of premises", the user's preference processing unit 18 gives the preference tag point associated with "OO hall" to the user.

Specifically, the user's preference processing unit 18 gives "perceptiveness (sense of beauty, insight, discernment): 1 point, output (end product): 1 point, creation (creature): 1 point, production (product): 1 point" to the user A who has viewed, the Web page related to OO hall. The user's preference processing unit 18 also gives "beginning (budding, origin, very start): 1 point, information (knowledge, experience, data): 1 point, writing (piece of writing, document, literary work): 1 point" to the user A.

Examples of the Web page related to OO hall include a Web page and the like included in a search result in a case of searching for "OO hall" in a search site and the like. The Web page can be specified in accordance with a table of correspondence and the like prepared in advance.

In this way, the site presentation device 10 can give the preference tag point to the tourist spot in accordance with information collected from a plurality of sites displaying different pieces of content about the same tourist spot. Thus, as compared with a ease of giving the preference tag point based on one Web site, the site presentation device 10 can enrich keywords suggesting the tourist spot or used for searching for the tourist spot. As a result, the site presentation device 10 can also improve estimation accuracy of preference of the user.

[c] Third Embodiment

Although the embodiments of the present invention have been described above, the present invention may be implemented in various different forms other than the embodiments described above.

[Example of Advertisement]

In the embodiments described above, described is an example in which the site presentation device 10 providing a tourism cloud provides an advertisement such as recommended information to a Web page of a Web site different from a Web site as a collection source of a tourist spot. However, the embodiment is not limited thereto. For example, the site presentation device 10 can cause an advertisement of recommended information to be displayed in the Web site as a collection source of the tourist spot.

Figure 14:
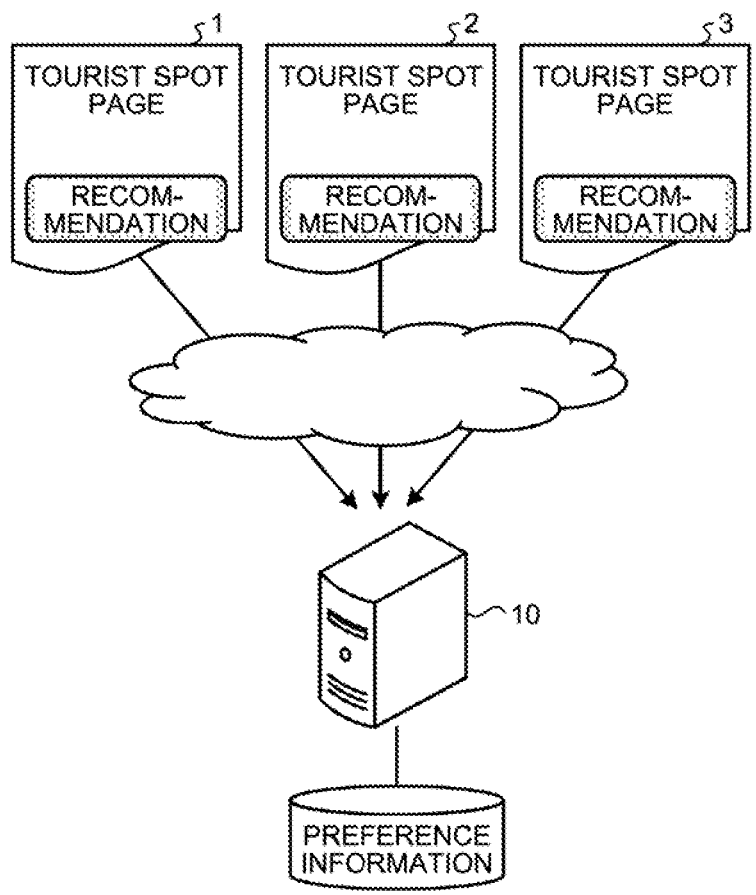
FIG. 14 is a diagram illustrating an example of an advertisement of recommended information according to a third embodiment.

FIG. 14 is a diagram illustrating an example of the advertisement of recommended information according to a third embodiment. As illustrated in FIG. 14, the site presentation device 10 collects information about a tourist spot from each of the Web sites 1, 2, and 3 of the tourist spot, and gives a preference tag point to the tourist spot. Thereafter, the site presentation device 10 causes the tourist spot suited for preference of the user to be displayed, as recommended information, in an advertisement region previously designated in each Web page.

[Tourist Spot]

In the above embodiments, a block of the tourist spot has been exemplified. However, the embodiment is not limited thereto. For example, the information may be various pieces of content the Web pages of which are assumed to be provided by a plurality of enterprises and the like, the pieces of content including a concert, a public performance, earthquake disaster information, disaster prevention information, earthquake information, and the like. Accordingly, the user can easily view more beneficial information among a plurality of pieces of earthquake disaster information, for example.

[System]

Each of the components of the illustrated device is not always physically configured as illustrated in the drawings in some cases. That is, the components can be distributed or integrated in optional units. All or any part of the processing functions executed by each device may be implemented by a CPU and a computer program analysed and executed by the CPU, or implemented as hardware based on wired logic.

Among the pieces of processing described in the present embodiment, all or part of pieces of processing described to be automatically performed can be manually performed, or all or part of pieces of processing described to be manually performed can be automatically performed using a known method. Information including the processing procedure, the control procedure, the specific name, and the various pieces of data or parameters described in the document and illustrated in the drawings can be optionally changed unless otherwise specified.

[Hardware]

Figure 15:
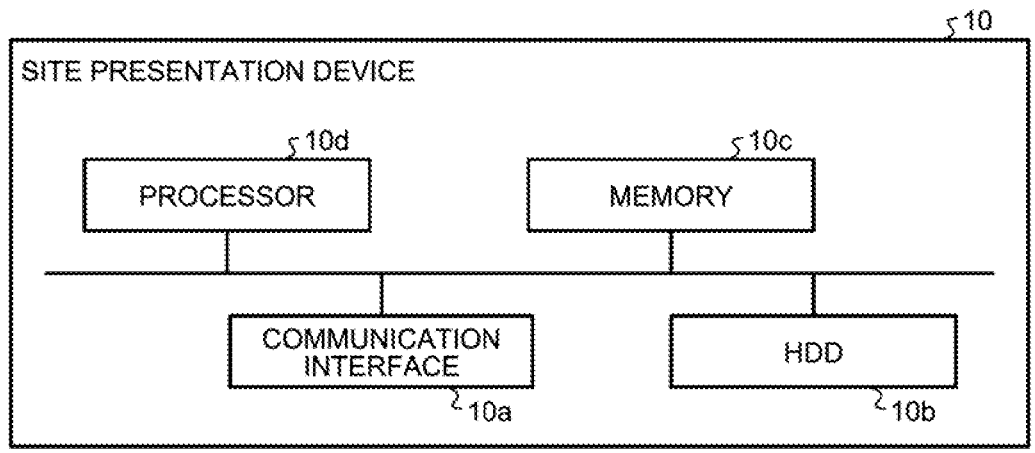
FIG. 15 is a diagram for explaining an example of a hardware configuration.

FIG. 15 is a diagram for explaining an example of a hardware configuration. As illustrated in FIG. 15, the site presentation device 10 includes a communication interface 10*a*, a hard disk drive (HDD) 10*b*, a memory 10*c*, and a processor 10*d*. The components illustrated in FIG. 15 are connected to each other via a bus and the like.

The communication interface 10*a* is an interface that controls communication with another device, for example, a network interface card. The HDD 10*b* stores a computer program that causes the functions illustrated in the drawings such as FIG. 2 to operate, a DB, a table, and the like.

The processor 10*d* reads out, from the HDD 10*b* and the like, a computer program that executes the same processing as that of each processing unit illustrated in the drawings such as FIG. 2 and loads the computer program into the memory 10*c* to cause a process to operate, the process for executing each function described in the drawings such as FIG. 2.

That is, this process executes the same function as that of each processing unit included in the site presentation device 10. Specifically, the processor 10*d* reads out, from the HDD 10*b* and the like, a computer program having the same function as that of the spot information collecting unit 14, the keyword extracting unit 15, the superordinate word acquisition unit 16, the point giving unit 17, the user's preference processing unit 18, the recommendation unit 19, and the like. The processor 10*d* then executes a process for executing the same processing as that of the spot information collecting unit 14, the keyword extracting unit 15, the superordinate word acquisition unit 16, the point giving unit 17, the user's preference processing unit 18, and the recommendation unit 19.

In this way, the site presentation device 10 operates as an information processing device that reads out and executes the computer program to execute an itinerary determining method. Alternatively, the site presentation device 10 can read out the computer program from a recording medium, with a medium reading device, and can implement the same function as that in the embodiment described above by executing the read-out computer program. The computer program described in the other embodiments is not limited to a computer program executed by the site presentation device 10. For example, the present invention can be similarly applied to a case in which another computer or server executes the computer program and a case in which another computer and a server execute the computer program in cooperation with each other.

According to the embodiments, a site desired by a user can be provided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, if should be understood that the various changes, substitutions, and alterations could be made hereto without departing from the spirit and scope of the invention.

What is claimed is:

1. A web site presentation method comprising:
   detecting a superordinate word of a word in a document in each of a plurality of web sites as a preference tag that indicates a feeling for each of the plurality of web sites, the superordinate word of the word being acquired by inquiring a superordinate word management server, using a processor;
   specifying, based on an access history of a certain user to any of the plurality of web sites, a preference tag that indicates a feeling corresponding to a preference of the certain user based on a detected preference tag of a web site accessed by the certain user, using the processor;
   giving preference tag points of user corresponding to a feeling of the certain user based on an association between the preference tag specified at specifying and preference tag points that indicates association between the preference tag and points given to the preference tag; and
   extracting, from the plurality of web sites, a web site in which a preference tag that is the same as or similar to the specified preference tag that indicates a feeling is detected, and presenting the extracted web site to the certain user, using the processor.

2. The web site presentation method according to claim 1, wherein each of the web sites includes information about a tourist spot.

3. The web site presentation method according to claim 1, the method further comprising:
   estimating the preference of the user based on the preference tag points that the user gave to the plurality of web sites;
   extracting a web site corresponding to the estimated preference of the user; and
   presenting the web site extracted to the certain user.

4. A non-transitory computer-readable recording medium having stored therein a web site presentation program that causes a computer to execute a process comprising:
   detecting a superordinate word of a word in a document in each of a plurality of web sites as a preference tag that indicates a feeling for each of the plurality of web sites, the superordinate word of the word being acquired by inquiring a superordinate word management server;
   specifying, based on an access history of a certain user to any of the plurality of web sites, a preference tag that indicates a feeling corresponding to a preference of the certain user based on a detected preference tag of a web site accessed by the certain user;
   giving preference tag points of user corresponding to a feeling of the certain user based on an association between the preference tag specified at specifying and preference tag points that indicates association between the preference tag and points given to the preference tag; and
   extracting, from the plurality of web sites, a web site in which a preference tag that is the same as or similar to the specified preference tag that indicates a feeling is detected, and presenting the extracted web site to the certain user.

5. A web site presentation device comprising:
   a processor configured to:
   detect about a superordinate word of a word in a document in each of a plurality of web sites as a preference tag that indicates a feeling for each of the plurality of web sites, the superordinate word of the word being acquired by inquiring a superordinate word management server;
   specify, based on an access history of a certain user to any of the plurality of web sites, a preference tag that indicates a feeling corresponding to a preference of the certain user based on a detected preference tag of a web site accessed by the certain user;
   give preference tag points of user corresponding to a feeling of the certain user based on an association between the specified preference tag and preference tag points that indicates association between the preference tag and points given to the preference tag; and
   extract, from the plurality of web sites, a web site in which a preference tag that is the same as or similar to the specified preference tag that indicates a feeling is detected, and presents the extracted web site to the certain user.

* * * * *